Figure 3:
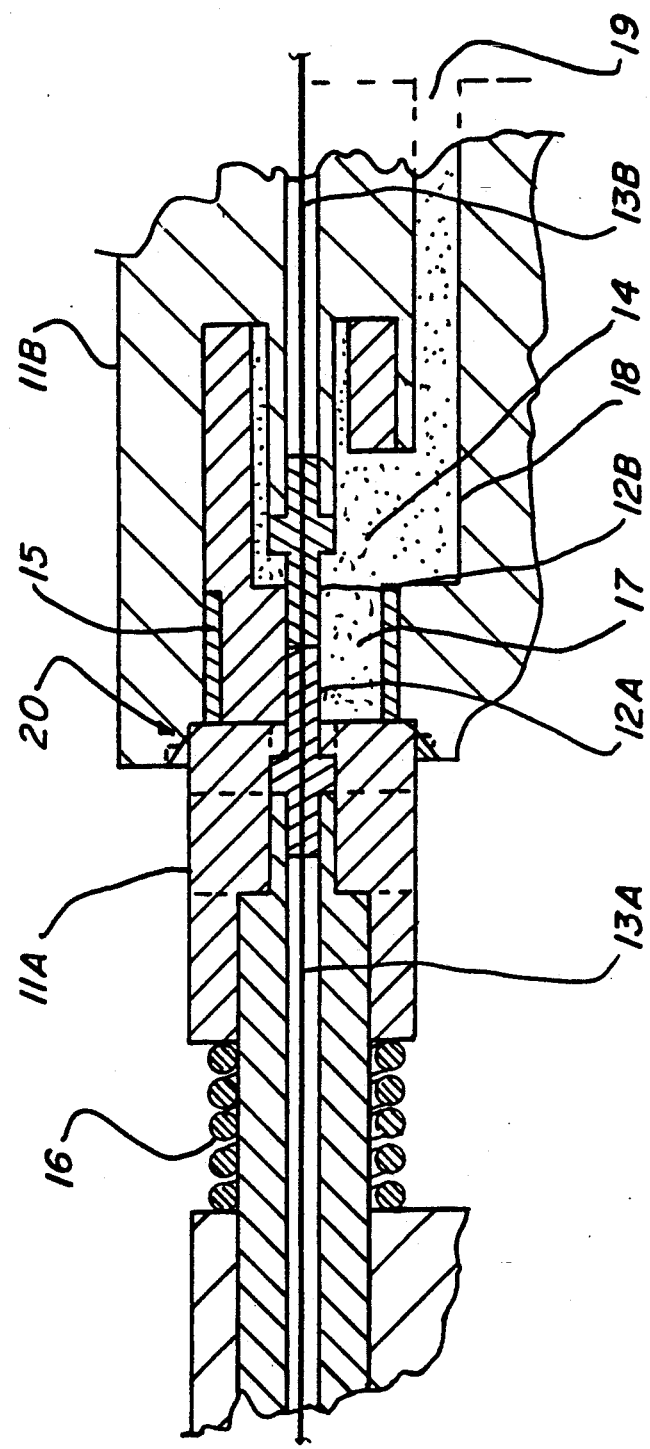

United States Patent
Berg

[11] Patent Number: 5,146,524
[45] Date of Patent: Sep. 8, 1992

[54] FIBRE OPTIC CONNECTOR

[76] Inventor: Arne Berg, Vipev. 10, N-7082 Kattem, Norway

[21] Appl. No.: 749,711

[22] Filed: Aug. 26, 1991

[30] Foreign Application Priority Data
Mar. 3, 1989 [NO] Norway ................................ 890905
Jan. 16, 1990 [WO] PCT Int'l Appl. ................... PCT/NO90/00012

[51] Int. Cl.⁵ ................................................ G02B 6/38
[52] U.S. Cl. ............................................ 385/75; 385/72
[58] Field of Search ..................... 385/75, 60, 66, 67, 385/68, 59, 72

[56] References Cited
U.S. PATENT DOCUMENTS
4,277,135  7/1981  Shrott et al. ........................ 385/59

Primary Examiner—John D. Lee
Assistant Examiner—John Ngo
Attorney, Agent, or Firm—James E. Pittenger

[57] ABSTRACT

A fibre optic connector for use under water is described. Each of the two connector parts (1a, 1b) in the device contains a greasy or visco-elastic filling compound (4) which protects the ferrules (2a, 2b) and the centering unit (5), and which is displaced during mating so that light is allowed to pass. When the connector is disconnected, the filling compound (4) is drawn back across the ferrules and centering unit to provide protection again. The compound (4) is chosen so that it can remain exposed to seawater without changing its characteristics or be dissolved or washed away.

7 Claims, 3 Drawing Sheets

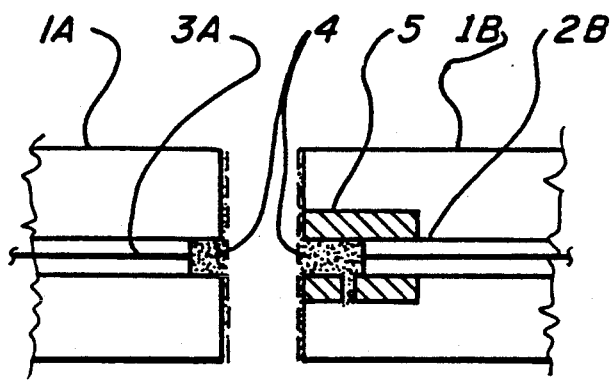
Fig_1A
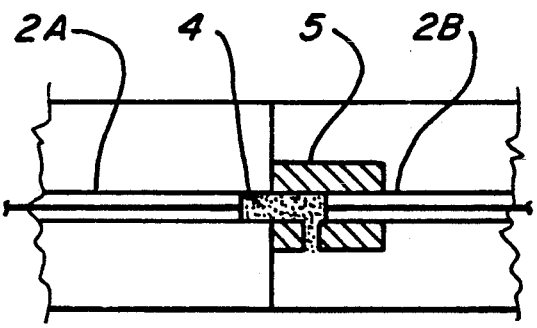
Fig_1B
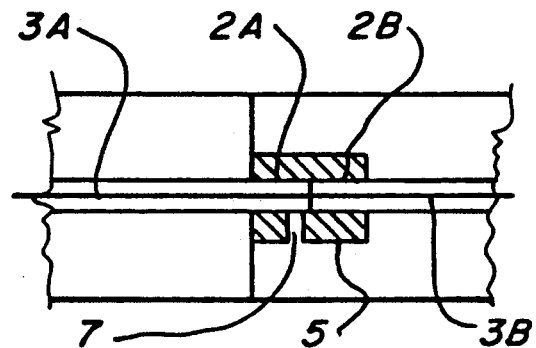
Fig_1C

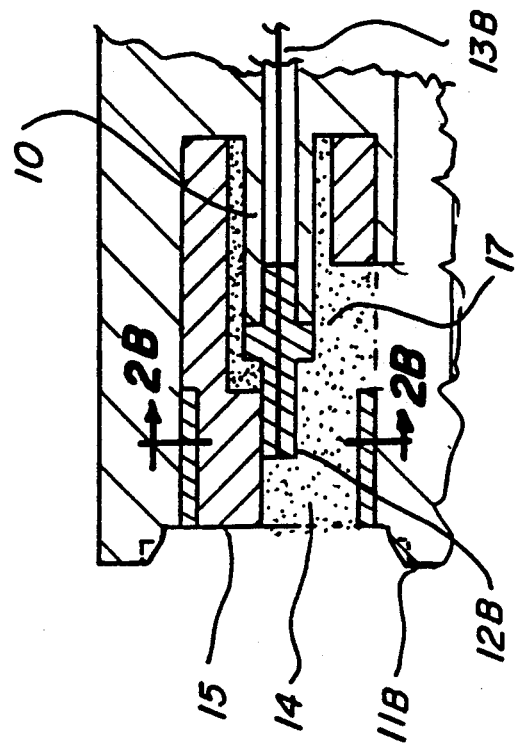
Fig_2A
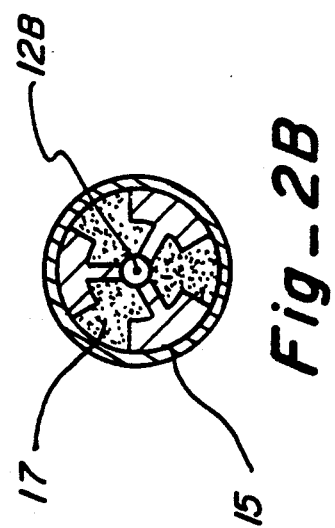
Fig_2B
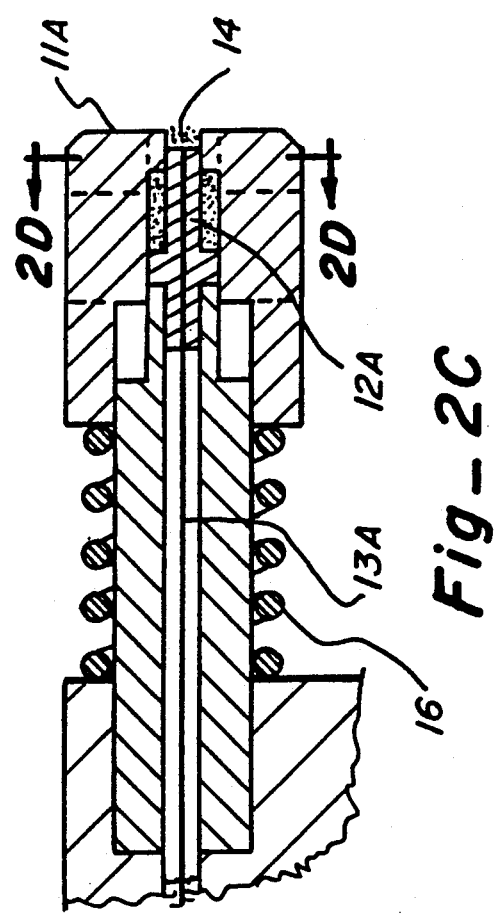
Fig_2C
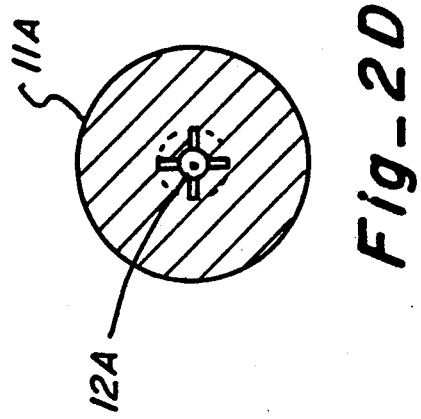
Fig_2D

FIBRE OPTIC CONNECTOR

This invention relates to a fibre optic connecting device which in particular is intended for underwater applications. The device can be connected and disconnected under water and is suitable for integration with other underwater connectors (electrical, hydraulic etc.).

One objective of this invention is to provide a device which gives the necessary protection of the fibre ends and precision parts used in a connector, and which has a simpler design and function than found in the known solutions for similar purposes. A typical example of a known solution is stated in Norwegian Patent Application no. 85.4758. In this Application the protective fluid, i.e. usually oil, is enclosed in chambers in each of the mating parts of the connector. Membranes that cover the front of these chambers are designed so as to be penetrated by fibre ferrules so that contact is established. This is obviously a complicated and unreliable construction, and in principle all solutions which are to provide the type of protection referred to here and which are based on oil or similar low viscosity media, will have similar drawbacks and disadvantages.

The present invention is based on a fibre optic connecting device consisting of two mating connector halves, each with a protective housing and at least one ferrule for the end of each optical fibre. One housing includes a centring unit which guides the ferrules so that they connect accurately, and each part of the connector is filled with a filling compound to protect vital, sensitive components, particularly the ferrules and fibre ends.

The innovative and distinctive characteristics of the device in the present invention are mainly found in the compound used as a filler. The compound is insoluble in water and consists of a greasy or visco-elastic material such as silicone grease, which is able to withstand shear forces so that when the connector is disconnected, it has a stable, free surface towards environments such as seawater. Further, during connection or disconnection the relative movements of the parts of the connector and/or its components are designed so as to cause a pumping action that during connection forces some of this compound away from the area around the fibre ends and inwards into one or both parts of the connector, and during disconnection draws the medium that has been pressed away, back towards this area, to provide protection when the connector is disconnected.

It is particularly important to protect the critical surfaces of the high precision parts and elements in the device when the connector is disconnected. This will be even more important in the case of connectors with strict tolerance requirements something which is of great significance for certain applications of this invention.

When the two connector halves are joined so that a connection is made, the visco-elastic compound is displaced and stored until the connector is disconnected. This specially-chosen compound has to be such that it can be exposed to seawater without its qualities being changed and without loss of material, e.g. by being washed off or dissolved by the water. At the same time, its viscosity must be sufficiently low to allow it to move backwards and forwards in the connector during connection and disconnection.

Other desired qualities for the visco elastic compound depend on the particular use of the connector, e.g. the temperature range where these crucial qualities have to be present. On subsea oil installations this may involve a temperature range for 0° to 120°. The optical characteristics are of less importance as none, or very little, of the compound will be left at the ferrules or the actual fibres when the connector halves are pressed together to establish optical contact. It is more important that the compound can adhere to the type of metal of which these parts and elements are made. There are various kinds of silicone grease commercially available that satisfy the normal requirements for the greasy or visco-elastic compound to be used in the connector according to the present invention.

The present invention allows the connector to be connected and disconnected numerous times with satisfactory protection of the precision parts in the connector.

A simple design has been achieved by using commercially available ferrules for positioning the fibre ends. The ferrules are manufactured with extreme accuracy and will position the fibre ends against each other when the outside surfaces are parallel. The ferrules are positioned in a centring unit which has to provide radial pressure on the ferrules from at least three sides and simultaneously ensure that the protective medium can be displaced when the connector is being connected.

A special advantage from a practical point of view is that this design makes it possible to exchange or add filling compound when required. This can be required because some of the compound will be lost during use, particularly following repeated connector operations.

The invention will be explained in more detail below, with reference to the figures, where:

FIGS. 1A, 1B and 1C are simplified diagrams showing the principle of the device according to the invention, seen in longitudinal section.

FIGS. 2A-D illustrate by sectional views a detailed design of the two parts of the connector.

FIG. 3 presents a sectional view of the two parts in FIGS. 2A-D when connected.

FIGS. 1A-C indicate how the connector works in principle. FIG. 1A shows the two parts of the connector when disconnected. FIG. 1B presents the parts of the connector close together but before optical contact has been made. The completed connection is shown by the position of the parts in FIG. 1C.

FIG. 1A shows the male connector's protective housing 1a pulled forward over ferrule 2a in the male connector. The fiber 3a is protected by the ferrule and the end surface by the visco-elastic compound 4. In the same way ferrule 2b in the female connector is protected by compound 4 and the protective housing 1b of the female connector. The female connector also contains centring unit 5. Compound 4 mainly fills the recess immediately in front of the ends of ferrules 2a and 2b, but it can also protect a larger or smaller part of the surrounding end surfaces on the respective parts of the connector.

When the parts are being connected the two protective housings 1a and 1b are first pressed towards each other as shown in FIG. 1B. Then ferrule 2a in the male connectors is pressed into the centring unit 5 in the female connector, as shown in FIG. 1C. This causes some of compound 4 to be pressed into the space (not illustrated here) in the back of the protective housing 1b of the female connector through one or more slots 7 in the centring unit 5. When there is more or less direct contact between the ends of the ferrules 2a and 2b, light will be allowed to pass. When the parts are being disconnected, the maleconnector's ferrule 2a will first be retracted. This movement will draw filling compound 4 back in through slots 7 so that it can again provide protection for the ferrules and the fibre ends (as in FIG. 1A).

FIGS. 2A-D show a more detailed and as an example a design of the individual parts in a connector based on the principle shown in FIGS. 1A-C. FIG. 2A shows the female connector's protective housing 11b with ferrule 12b, centring unit 15 and protective medium 14. A tubular part 10 inside housing 11b serves as a holder for ferrule 12b.

FIG. 2B shows a sectional view across line A—A in FIG. 2A. It is seen from this together with FIG. 2A that the centring unit 15 is made of slots or openings 17 that are filled with the compound 14, and the forward end of ferrule 12b is guided between three radially projecting parts in centring unit 15. As is shown in FIG. 3, slots 17 communicate with a through-going passage in connector part 11b.

FIG. 2C shows the protective housing 11a of the male connector when the contact is disconnected. The housing protects ferrule 12a and the protecting compound 14. The protective housing 11a can be moved in relation to the ferrule 12a and is pressed forward by a spring arrangement 16. FIG. 2D shows the connector in section across line B—B in FIG. 2C.

Similarly to what is shown in FIGS. 1A-C, the outer end of the ferrules in the disconnected position in FIGS. 2A and 2C is slightly retracted in relation to the end surface of the respective parts of the connector 11a and 11b, so that compound 14 can generously cover the fibres, lying almost like a plug in the recess in front of the ferrules. This is most clearly shown in FIG. 2C. In connector part 11b there is a more extensive or voluminous filling of compound 14, which is because of the function this part has as a place for displacement and storage for a large part of compound 14. Otherwise, in practice, it is best to fill all the spaces and gaps inside the two parts of the connector as completely as possible with the visco-elastic compound so as to obtain optimal, comprehensive protection.

FIG. 3 shows the connector when connected. Ferrules 12a and 12b are pressed towards each other and are positioned with centring unit 15. Before the ferrules are pressed together the front surfaces of the parts of the connector or their housing 11a and 11b are pressed-tightly together, with guidance and tightening performed by a chamfer in the male part 11a and a seat-shaped area 20 on the rim at the end of the female part 11b. It is important that the parts are being pressed tightly together to obtain a pumping or displacement of the medium 14, and this is maintained during the movement of the ferrule 12a both during connection and disconnection.

In the position shown in FIG. 3 the protective housing 11a of the male connector is pulled back in relation to ferrule 12a. The protective compound is now pressed out to make room for the male connector's ferrule 12a. An extremely important characteristic of the design is an extended passage 18 in the housing 11b. This passage 18 is joined to slots 17 in unit 15 at one end and is open to the surroundings, e.g. seawater, at the opposite end as shown at 19. This means that the compound will have a free surface in opening 19, or at a distance into passage 18, and it can be moved backwards and forwards in the passages due to the pumping action already mentioned, without any notable loss of material. If f.inst. a slight amount of seawater from the surroundings should get mixed in with the filling compound in passage 18, the intended operation would not be altered very much.

When the parts are being disconnected, ferrule 12a will first be drawn to the left in FIG. 3. During this first phase the protective housing 11a of the male connector is still pressed against the protective housing 11b of the female connector by spring 16. The movement will draw the material 4 that had been pressed out, back from its temporary storage in the protective housing of the female connector.

In the examples that have been described, the female part of the connector is designed so as to serve as a storage space for the displaceable protection medium, but this does not preclude the male part from having a similar function too, at least to a certain degree. The amount of available space may, however, make this difficult, particularly in miniature versions of the connector. There are also other points in the above description related to the figures, where modifications may be relevant. To facilitate the mating of the connector, guiding pins of known construction can be added in addition to the chamfered and seat-shaped end surfaces mentioned previously. Such pins could provide a coarse guidance in the initial phase of the mating process. The examples have described the connection of a single optical fibre but obviously the solutions shown here can easily be adapted to connectors with several parallel fibres.

I claim:

1. A fibre optic connecting device comprising two cooperating connector parts, each having a protective housing (1a, 1b, 11a, 11b) and at least one ferrule (2a, 2b, 12a, 12b) for a corresponding end of an optical fibre (3a, 3b, 13a, 13b), where a centring unit (5, 15) serves to guide the ferrules to make accurate connections, and where each part of the connector is filled by a filling agent (4, 14) to protect vital, sensitive components, characterized by the filling agent (4, 14) consisting of a material that is insoluble in water, and is a greasy or visco-elastic substance capable of withstanding shear forces when the connector is disconnected giving it a stable, free surface towards the surroundings, and that during connection or disconnection the relative movements of the parts of the connector (1a, 1b, 11a, 11b) and/or components (2a, 2b, 12a, 12b) in said parts are arranged so as to cause a pumping action that during connection presses some of said agent (4, 14) away from the area around the fibre ends inwards in one or both parts of the connector, and during disconnection draws the agent that has been pressed away, back towards the area around the fibre ends, so as to provide the required protection while being in a disconnected state.

2. A device in accordance with claim 1, where the two parts of the connector are shaped as a male connector (1a, 11a) and a female connector (1b, 11b) respectively and characterized by passages (7, 17, 18) for retaining the filling agent that has been pressed away, mainly being incorporated in the female connector (1b, 11b).

3. A device in accordance with claim 2, characterized by the said passages (17, 18) going through the female connector and having an external opening (19) at the opposite end.

4. A device in accordance with claim 2 with a centering device consisting of a centring unit (15) in the female connector characterized by the centering unit (15) being designed with slots (17) around the ferrule (12b), to allow the said pressing away and drawing back of the filling agent (14).

5. A device in accordance with claim 1, characterized by the said pumping action mainly being achieved by the ferrule (2a, 12a) in one connector part (1a, 11a) through relative linear movement in relation to the other connector part (1b, 11b) when connecting or disconnecting the parts.

6. A device in accordance with claim 5, characterized by the two parts of the connector being adapted to be pressed tightly together (20) during said relative linear movement.

7. A device in accordance with claim 1, characterized by the ferrules (2a, 2b, 12a, 12b), being designed so that when disconnected their position is retracted in relation to the adjacent surface at the end of each connector part (1a, 1b, 11a, 11b), so that a recess is formed at the end of each ferrule, said recess being designed to be filled with said filling agent (4, 14).

* * * * *